(12) United States Patent
Ogawa et al.

(10) Patent No.: US 8,932,419 B2
(45) Date of Patent: Jan. 13, 2015

(54) URETHANE (METH)ACRYLATE OLIGOMER AND SHEET USING THE SAME

(71) Applicant: Hitachi Chemical Company, Ltd., Tokyo (JP)

(72) Inventors: Yoshinobu Ogawa, Nagareyama (JP); Kazutoshi Doki, Satte (JP); Osamu Kawata, Otsu (JP); Yoshihiro Tani, Otsu (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 14/144,699

(22) Filed: Dec. 31, 2013

(65) Prior Publication Data

US 2014/0110048 A1    Apr. 24, 2014

Related U.S. Application Data

(62) Division of application No. 12/376,352, filed as application No. PCT/JP2007/065286 on Aug. 3, 2007, now abandoned.

(30) Foreign Application Priority Data

Aug. 4, 2006   (JP) ................ P2006-213806
Aug. 30, 2006  (JP) ................ P2006-233151

(51) Int. Cl.
| | | |
|---|---|---|
| *C08F 2/50* | (2006.01) | |
| *B29C 65/48* | (2006.01) | |
| *C08F 290/06* | (2006.01) | |
| *C08G 18/10* | (2006.01) | |
| *C08G 18/62* | (2006.01) | |
| *C08G 18/67* | (2006.01) | |
| *C08G 18/76* | (2006.01) | |
| *C09D 175/16* | (2006.01) | |

(52) U.S. Cl.
CPC ......... *B29C 65/4845* (2013.01); *C08F 290/067* (2013.01); *C08G 18/10* (2013.01); *C08G 18/6229* (2013.01); *C08G 18/672* (2013.01); *C08G 18/7642* (2013.01); *C09D 175/16* (2013.01)
USPC ............... 156/106; 522/90; 522/6; 522/117; 522/172; 522/173

(58) Field of Classification Search
USPC ............... 156/106; 522/90, 6, 117, 172, 173
See application file for complete search history.

(56) References Cited

U.S. PATENT DOCUMENTS

| | | |
|---|---|---|
| 4,097,439 A | 6/1978 | Darling |
| 4,188,455 A | 2/1980 | Howard |
| 4,224,454 A | 9/1980 | McDowell et al. |
| 4,391,686 A | 7/1983 | Miller et al. |
| 5,462,797 A | 10/1995 | Williams et al. |
| 5,486,570 A | 1/1996 | St. Clair |
| 6,022,907 A | 2/2000 | Ikeda et al. |
| 6,524,564 B1 | 2/2003 | Kim et al. |

FOREIGN PATENT DOCUMENTS

| | | |
|---|---|---|
| CN | 1129720 | 8/1996 |
| JP | 01-113469 | 5/1989 |
| JP | 03-041174 | 2/1991 |
| JP | 04-255781 | 9/1992 |
| JP | 10-330453 | 12/1998 |
| JP | 2001-316447 | 11/2001 |
| JP | 2002-023649 | 1/2002 |
| JP | 2002-523582 | 7/2002 |
| JP | 2003-12751 | 1/2003 |
| JP | 2004-043626 | 2/2004 |
| JP | 2004-359808 | 12/2004 |
| JP | 2005-097439 | 4/2005 |
| JP | 2005-249854 | 9/2005 |
| TW | 200624449 | 7/2006 |

OTHER PUBLICATIONS

Communication mailed Jan. 9, 2013, in connection with Taiwanese Patent Application No. 10220021120, 7 pages; Taiwan Patent Office, Taiwan.
Communication mailed Jul. 17, 2012, in connection with Japanese Patent Application No. 2006-233151, 2 pages; Japanese Patent Office, Japan.
Translation of the International Preliminary Report on Patentability dated Feb. 19, 2009, for Application No. PCT/JP2007/065286.
English language translation (machine generated) JP 2004-043626, Dec. 2004.

*Primary Examiner* — Margaret Moore
(74) *Attorney, Agent, or Firm* — Antonelli, Terry, Stout & Kraus, LLP.

(57) ABSTRACT

Disclosed is a urethane (meth)acrylate oligomer which is obtained by reacting at least one polyoxyalkylene polyol (A), at least one monool (B1) soluble in the component (A) and/or at least one silane coupling agent (B2) reactive with an isocyanate group, at least one polyisocyanate (C) and at least one hydroxylated mono (meth)acrylate compound (D) at a ratio at which the equivalent weights of hydroxy groups, active hydrogen groups and isocyanate groups in the respective components satisfy the following formulae (1)-(3). The urethane (meth)acrylate oligomer does not substantially contain an unreacted isocyanate group. $B(\text{active hydrogen})+D(OH)=C(NCO)-A(OH)$ (1) $1.05 \leq C(NCO)/A(OH) \leq 2$ (2) $\{C(NCO)-2A(OH)+2m\} \times 0.35 \leq D(OH) \leq \{C(NCO)-2A(OH)+2m\} \times 0.70$ (3) In the formulae (1)-(3), A(OH) represents the total equivalent weight of hydroxy groups contained in the component (A); B(active hydrogen) represents the total equivalent weight of active hydrogen groups contained in the component (B1) and/or the component (B2); C(NCO) represents the total equivalent weight of isocyanate groups contained in the component (C); D(OH) represents the total equivalent weight of hydroxy groups contained in the component (D); and m represents the number of moles of the component (A). The oligomer is photo-curable and is used as an adhesive sheet in a method of affixing an optical member to a display panel.

13 Claims, No Drawings

URETHANE (METH)ACRYLATE OLIGOMER AND SHEET USING THE SAME

CLAIM OF PRIORITY

The present application claims priority from Japanese Application No. P2006-213806, filed on Aug. 4, 2006, and Japanese Application No. P2006-233151, filed on Aug. 30, 2006, in the Japanese Patent Office, the contents of each of which are incorporated herein by reference. This application is a divisional of application Ser. No. 12/376,352, having a filing date of Jul. 2, 2010, now abandoned, the contents of which are incorporated herein by reference. application Ser. No. 12/376,352 is a 371 of International Application No. PCT/JP2007/065286, filed Aug. 3, 2007.

TECHNICAL FIELD

The present invention relates to an urethane (meth)acrylate oligomer, a method for producing the same, a photocurable composition including the same, and a sheet obtainable by curing the photocurable composition.

BACKGROUND ART

In recent years, display panels such as large flat panel displays and small lightweight displays are increasingly slimmed down and lightened through, for example, by slimming down of display components and by direct affixation of optical members. As a result, maintenance of impact resistance of these display panels is an important issue. In addition, as associated demands adhesive materials for affixing optical members to display panels are required to have removability from the display panels (reworkability). Conventionally, when an affixation failure occurs during production, the failed optical member is removed from the display panel, and affixed to the panel again. However, panels having a low strength can be broken during removal of the member, which results in the deterioration of the yield of expensive panels. The yield can be maintained or can be improved by improving the removability of the adhesive material.

In order to solve the above-described problems, for example, Japanese Patent Application Laid-Open No. 2002-23649 discloses a shock absorption laminate having a complicated multilayer structure composed of a shatterproof layer, two anti-cracking layers, and a transparent adhesive layer. However, from the viewpoint of practicality, the quality and cost of the laminate are not satisfactory.

Japanese Patent Application Laid-Open No. 2005-249854 discloses a shock absorption layer composed of a polyurethane resin, specifically an urethane resin prepared by radical polymerization of an oligomer having one to three (meth) acryl groups at the ends. Obviously an urethane resin is a material whose properties such as hardness, resiliency, and stickiness after curing can be widely varied by, for example, changing the combination of isocyanate and polyol components. However, Japanese Patent Application Laid-Open No. 2005-249854 does not specify the urethane resin, but only gives general explanation of isocyanates.

Japanese Patent Application Laid-Open No. 2001-316447 discloses a soft composition having stickiness with rubber hardness of 30 or less, the composition being prepared from a polyol having 2.4 to 3.0 functional groups and a molecular weight of 3,000 to 6,000, and a secondary or tertiary higher monoalcohol as the tackifier. In Japanese Patent Application Laid-Open No. 2001-316447, curing reaction is carried out through urethane reaction, and thus requires a long process including reaction at 100° C. for 2 hours, aging for 7 days and the like. Therefore, the method is suitable for cast molding, but unsuitable for other production methods more efficient than cast molding, for example, a method for producing a thick film sheet, wherein a composition is continuously applied onto a base film without including bubbles.

Japanese Patent Application Laid-Open No. 2004-359808 discloses a transparent gel adhesive and a sheet including the same, the transparent gel adhesive being composed of a three dimensionally crosslinked polymer swelled with a liquid containing a plasticizing agent and inorganic particles. In Japanese Patent Application Laid-Open No. 2004-359808, breeding tends to occur due to the use of a plasticizing agent, which may result in the contamination or corrosion of the adherend.

The above-described disclosures may partially improve the impact resistance of a display panel. However, it is not found adhesive material having impact resistance, combining adequate adhesion with removability, and providing mass productivity, transparency, and non-polluting properties.

DISCLOSURE OF INVENTION

The present invention has been made to solve the above-described problems of known techniques. An object of the present invention is to provide an urethane (meth)acrylate oligomer for efficiently producing a adhesive material (a thick sheet having a desired thickness) which imparts excellent impact resistance to optical members such as a thin display, combines both adequate adhesion and reworkability (removability), provides excellent non-polluting properties, and contains no bubble, transparency or the like. Another object of the present invention is to provide a method for producing the oligomer.

Yet another object of the present invention is to provide a photocurable composition for efficiently producing the adhesive material having the above properties, and to provide a sheet usable as the adhesive material.

As a result of dedicated research, the inventors have found that a highly transparent sheet containing no bubble, having excellent shock absorption properties, and combining both adequate adhesion and reworkability is obtainable through the use of an elastomer (shock absorption functional transparent adhesive elastomer) prepared through addition polymerization of an urethane (meth)acrylate oligomer, which is obtainable by reacting a polyoxyalkylene polyol, a monool which is soluble in the polyoxyalkylene polyol and/or a silane coupling agent which can react with isocyanate group, a polyisocyanate, and a hydroxy group-containing mono (meth)acrylate compound at a predetermined ratio. The present invention has been thus accomplished.

More specifically, an aspect of the present invention is to provide an urethane (meth)acrylate oligomer substantially free of unreacted isocyanate group, which is obtainable by reaction at least one polyoxyalkylene polyol (A), at least one monool (B1) which is soluble in the component (A) and/or at least one silane coupling agent (B2) which can react with isocyanate group, at least one polyisocyanate (C), and at least one hydroxy group-containing mono (meth)acrylate compound (D) at a ratio so that the equivalent weights of the hydroxy group, active hydrogen group, and isocyanate group of the respective components satisfy the following formulae (1) to (3):

$$B(\text{active hydrogen})+D(\text{OH})=C(\text{NCO})-A(\text{OH}) \quad (1)$$

$$1.05 \leq C(\text{NCO})/A(\text{OH}) \leq 2 \quad (2)$$

$$\{C(\text{NCO})-2A(\text{OH})+2m\} \times 0.35 \leq D(\text{OH}) \leq \{C(\text{NCO})-2A(\text{OH})+2m\} \times 0.70 \quad (3)$$

wherein in the formulae (1) to (3), A(OH) represents the total equivalent weight of the hydroxy group of the component (A), B(active hydrogen) represents the total equivalent weight of the active hydrogen group of the component (B1) and/or (B2), C(NCO) represents the total equivalent weight of the total equivalent weight of the isocyanate group of the component (C), and D (OH) represents the total equivalent weight of the hydroxy group of the component (D), and m represents the number of moles of the component (A).

Another aspect of the present invention is to provide a photocurable composition containing an urethane (meth) acrylate oligomer and a photopolymerization initiator. Yet another aspect of the present invention is to provide a sheet obtainable by forming a photocurable composition layer from a photocurable composition, and then curing the photocurable composition layer through photoirradiation.

Yet another aspect of the present invention is to provide a method for producing the urethane (meth)acrylate oligomer, comprising the step of reacting at least one polyoxyalkylene polyol (A), at least one monool (B1) which is soluble in the component (A) and/or at least one silane coupling agent (B2) which can react with isocyanate group, at least one polyisocyanate (C), and at least one hydroxy group-containing mono (meth)acrylate compound (D) at a ratio so that the equivalent weights of the hydroxy group, active hydrogen group, and isocyanate group of the respective components satisfy the following formulae (1) to (3), and so that the urethane (meth) acrylate oligomer is substantially free of unreacted isocyanate group:

$$B(\text{active hydrogen}) + D(\text{OH}) = C(\text{NCO}) - A(\text{OH}) \tag{1}$$

$$1.05 \leq C(\text{NCO})/A(\text{OH}) \leq 2 \tag{2}$$

$$\{C(\text{NCO}) - 2A(\text{OH}) + 2m\} \times 0.35 \leq D(\text{OH}) \leq \{C(\text{NCO}) - 2A(\text{OH}) + 2m\} \times 0.70 \tag{3}$$

wherein in the formulae (1) to (3), A(OH) represents the total equivalent weight of the hydroxy group of the component (A), B(active hydrogen) represents the total equivalent weight of the active hydrogen group of the component (B1) and/or (B2), C(NCO) represents the total equivalent weight of the total equivalent weight of the isocyanate group of the component (C), and D (OH) represents the total equivalent weight of the hydroxy group of the component (D), and m represents the number of moles of the component (A).

Disclosure of the present invention is related to the subject described in Japanese Patent Application No. 2006-213806 filed on Aug. 4, 2006 and Japanese Patent Application No. 2006-233151 filed on Aug. 30, 2006, and the disclosures of which are hereby incorporated herein by reference.

BEST MODE FOR CARRYING OUT THE INVENTION

As described above, the urethane (meth)acrylate oligomer of the present invention is obtainable by reacting at least one polyoxyalkylene polyol (A), at least one monool (B1) which is soluble in the component (A) and/or at least one silane coupling agent (B2) which can react with isocyanate group (hereinafter the components (B1) and (B2) may be generically referred to as component (B)), at least one polyisocyanate (C), and at least one hydroxy group-containing mono (meth)acrylate compound (D).

The polyoxyalkylene polyol (A) used in the present invention contains two or more hydroxy groups in one molecule thereof, and is also referred to as polyether polyol. More specifically, it is obtainable by addition polycondensation of a compound containing two or more active hydrogen groups in one molecule thereof, such as polyhydric alcohols, polyhydric phenols, or amine with alkylene oxides. The compound containing two or more active hydrogen groups in one molecule thereof may be an aliphatic, alicyclic, or aromatic compound. The oxyalkylene added to the compound preferably has 2 to 4 carbon groups, and preferable examples thereof include polyethylene glycol, polypropylene glycol, polybutylene glycol, tetramethylene glycol, and copolymers of two or more thereof, for example, copolymers of ethylene oxide with propylene oxide, ethylene oxide with tetrahydrofuran or the like.

The polyoxyalkylene polyol (A) may be bifunctional and/ or more multifunctional, which may be used alone or in combination thereof. The number of the functional groups depends on the initiator used for the synthesis of the polyoxyalkylene polyol (more specifically, the initiator is the compound containing two or more active hydrogen groups in one molecule thereof, such as polyhydric alcohols, polyhydric phenols, or polyvalent amines). There are well-known synthesis methods using the initiator. Preferable examples of the initiator include the followings. Those used for the synthesis of bifunctional ones include diols such as ethylene glycol, diethylene glycol, propylene glycol, dipropylene glycol, neopentyl glycol, 1,4-butanediol, 1,6-hexanediol, and adducts thereof with an alkylene oxide. Those used for the synthesis of trifunctional or more multifunctional ones include glycerin, trimethylolpropane, pentaerythritol, sorbitol, and adducts thereof with an alkylene oxide. Among these compounds, preferred are diols and triols having 2 to 4 carbon atoms, and particularly preferred are ethylene glycol, propylene glycol, and glycerin. The polyoxyalkylene polyol (A) may be used alone, in combination of a plurality of kinds thereof, or in combination of those containing different numbers of hydroxy groups within one molecule thereof.

The number average molecular weight of the polyoxyalkylene polyol (A) is particularly preferably within the range of 1000 to 20000 from the viewpoint of shock absorption properties. It means that the "number average molecular weight" of polyoxyalkylene polyol is calculated on the basis of its hydroxyl value (OHv, the unit is mgKOH/g) by using the following formula:

number average molecular weight=(56100/OHv)× number of average functional group per molecule wherein the hydroxyl value is measured according to JIS K1557 6.4. The polyoxyalkylene polyol (A) is preferably used in a liquid state at the below-described reaction temperature.

The monool (B1) used in the present invention is a compound containing one hydroxy group within one molecule thereof, and may be selected from those compatible with the polyoxyalkylene polyol. Specific examples thereof include polyoxyalkylene monool, acryl monool, castor oil-based monool, natural or synthetic higher alcohols and the like. The polyoxyalkylene monool is obtainable in the similar manner as that used for the polyoxyalkylene polyol, more specifically, by addition polymerization of an initiator containing one active hydrogen group with an alkylene oxide. Preferable examples of the initiator are the same as those of the polyoxyalkylene polyol, (but the number of hydroxy group is one for example, monoalcohols, monophenols, and monoamines). Specific examples thereof include monoalcohols obtainable by substituting one or two hydroxy groups of the bifunctional or trifunctional alcohol with hydrogen atom(s). Acryl monools are acrylic polymers containing one hydroxyl group within one molecule thereof. Castor oil-based monools are higher monools having 18 carbon atoms prepared from ricinoleic acid, which is a hydrolysate of castor oil. Natural or synthetic monoalcohols are monofunctional alcohols having 6 or more carbon atoms, preferably 6 to 30 carbon atoms, and examples thereof include 2-ethylhexyl alcohol, sec-stearyl alcohol, α-terpineol, diacetone alcohol, capryl alcohol and the like. The number average molecular weight of the monool is preferably within the range of 100 to 10000. The number average molecular weight of the monool (B1) may be measured in the same manner as that used for the polyoxyalkylene polyol (A).

The silane coupling agent (B2) used in the present invention is a silane-based compound having so-called coupling effect, and contains an active hydrogen group which react with the terminal isocyanate group of an urethane prepolymer. The preferable silane coupling agent (B2) has an alkoxysilyl group at one end and an active hydrogen group such as a mercapto group or amino group at the other end, and particularly preferably has a mercapto group at one end.

In the present invention, the (B1) and (B2) may be used alone or in combination thereof.

At least one of the polyoxyalkylene polyol (A) and monool (B1) preferably contain an ethylene oxide unit as the copolymerization component. The type of ethylene oxide polymerization may be random or block. The copolymerization ratio of the ethylene oxide component is, in terms of weight percentage, from 3% to 60%, preferably from 5% to 40% with reference to the polyoxyalkylene polyol (A) or monool (B1). If the ratio is less than 3%, haze (white turbidity) may occur after standing in a heat and humidity environment with a temperature of 50° C. and a relative humidity of 95% for 7 days. If the ratio is more than 60%, the cured product may be so hard that it has insufficient shock absorption properties.

Examples of the polyisocyanate (C) include aromatic polyisocyanates, alicyclic polyisocyanates, aliphatic polyisocyanates, which contain two or more isocyanate groups, mixture of two or more thereof, and modified polyisocyanates obtainable by modifying the above compounds. The polyisocyanate compound is preferably a diisocyanate compound containing two isocyanate groups. Specific examples thereof include polyisocyanate compounds such as tolylene diisocyanate (TDI), 4,4'-diphenylmethane diisocyanate (MDI), polymethylene polyphenyl isocyanate (crude MDI), 1,5-naphthylene diisocyanate (NDI), tolidine diisocyanate (TODI), xylylene diisocyanate (XDI), trimethyl xylylene diisocyanate (TMXDI), isophorone diisocyanate (IPDI), hexamethylene diisocyanate (HDI), norbornene diisocyanate (NBDI), and hydrogenated MDI, and prepolymer-modified, nurate-modified, urea-modified, carbodiimide modified products thereof. Among these compounds, preferred are aliphatic diisocyanates having 3 to 9 carbon atoms, such as hexamethylene diisocyanate (HDI), and aromatic (particularly benzene ring-containing aromatic) diisocyanates such as xylylene diisocyanate (XDI).

The hydroxy group—containing mono(meth)acrylate compound (D) is preferably an ester of a (meth) acrylic acid with an aliphatic, alicyclic, or aromatic diol, and particularly preferably an ester with an alkanediol having 1 to 8 carbon atoms. Examples thereof include 2-hydroxyethyl (meth)acrylate, 2-hydroxypropyl (meth)acrylate, 4-hydroxybutyl (meth) acrylate, poly(n=2 to 10 on average)ethylene glycol mono (meth)acrylate, poly(n=2 to 10 on average)propylene glycol mono(meth)acrylate, 2-hydroxy-3-phenyloxypropyl (meth) acrylate and the like.

The urethane (meth)acrylate oligomer of the present invention is obtainable by reacting the above-described components at a ratio so that the equivalent weights of the hydroxy group, active hydrogen group, and isocyanate group of the respective components satisfy the following formulae (1) to (3):

$$B(\text{active hydrogen})+D(\text{OH})=C(\text{NCO})-A(\text{OH}) \quad (1)$$

$$1.05 \leq C(\text{NCO})/A(\text{OH}) \leq 2 \quad (2)$$

$$\{C(\text{NCO})-2A(\text{OH})+2m\}\times 0.35 \leq D(\text{OH}) \leq \{C(\text{NCO})-2A(\text{OH})+b\,2m\}\times 0.70 \quad (3)$$

wherein in the formulae (1) to (3), A(OH) represents the total equivalent weight of the hydroxy group of the component (A), B(active hydrogen) represents the total equivalent weight of the active hydrogen group of the component (B1) and/or (B2), C(NCO) represents the total equivalent weight of the isocyanate group of the component (C), and D(OH) represents the total equivalent weight of the hydroxy group of the component (D), and m represents the number of moles of the component (A). As long as all of the formulae (1) to (3) are satisfied, (2) and (3) may be each independently selected.

In the respective formulae, the "total equivalent weight" of hydroxy group, active hydrogen group, or isocyanate group of one component is basically determined by multiplying the number of hydroxy group, active hydrogen group, or isocyanate group contained in one molecule of the component by the number of moles of the component. When one component contains a plurality of kinds of molecules, the total equivalent weight means the sum of the equivalent weight calculated for each molecule. For example, as the component (A), when one mole of polyoxyalkylene polyol containing two hydroxy groups in one molecule thereof and two moles of polyoxyalkylene polyol containing three hydroxy groups in one molecule thereof are involved in the reaction, A (OH) in the above-described formulae is (2×1)+(3×2)=8, respectively. The same applies to other components and active hydrogen and isocyanate groups. The active hydrogen group in the "B(active hydrogen)" is a hydroxy group when the component (B) is monool (B1), or an active hydrogen group such as a mercapto group or amino group when the component (B) is a cyan coupling agent (B2) which can react with isocyanate group. For example, in "C(NCO)–A(OH)", "−" means a minus.

The respective formulae define the ratio among the respective components subjected to chemical reaction, and does not refer to the ratio of charges. The reaction among respective the components is urethane reaction. As is well known to those skilled in the art of polyurethane, urethane reaction can be completely or at least almost completely progressed under appropriate conditions well known to those skilled in the art. In the production of polyurethane, conventionally reaction has been carried out under such conditions. Accordingly, the conditions specified by the above formulae can be satisfied by allowing the components to react in charges which satisfy the formulae, and completely or at least completely progressing the urethane reaction under well-known conditions. Examples of specific reaction conditions are described in detail in the following examples.

The formula (1) defines that the sum of the total equivalent weight of the hydroxy groups of the components (A), (B) and (D) (or active hydrogen group when the component (B) is a silane coupling agent) is equal to the total equivalent weight of isocyanate group of the component (C). In other words, the formula (1) shows that these components cause urethane reaction.

From technical standpoint, the formula (2) specifies the average length of the repeated segment of the components (C) and (A) composing the oligomer excluding its ends. The component (B) and/or component (D) composing the ends are compounds containing hydroxy group or active hydrogen group. Therefore, in the residual oligomer excluding the component (B) and/or component (D), the ratio of the number of isocyanate group is always larger than the number of hydroxy group, so that the C(NCO)/A(OH) is more than 1 and the maximum of that is 2. When the C(NCO)/A(OH) gets closer to 1, the repeated numbers of the components (C) and (A) increase, and thus the molecular weight of the urethane acrylate oligomer increases, which results in the increase of the viscosity. The C(NCO)/A(OH) is from 1.05 to 2 as defined by the formula (2), and is preferably from 1.2 to 2 thereby achieving workable viscosity. When the C(NCO)/A(OH) is 1, the components (B) and (D) cannot react, so that intended oligomer cannot be obtained. In the practical production process, the ratio of the C(NCO)/A(OH) in the charge may be 2 or more to mix. In such case, the component (C) where the C(NCO)/A(OH) exceeds 2, will not react with the component (A), but reacts with the component (B) and/or component (D) in the subsequent process to be included in the oligomer of the present invention as a by-product. The present invention will not exclude the formation and inclusion of the by-product.

The formula (3) technically means the average addition number of the component (D) for one molecule of the oligomer, and is derived from the following concept. The end groups of the oligomer may be the component (B) and/or component (D). The reaction site to which the end group component can be added is C(NCO)–A(OH). When the component A contains hydroxyl groups so that the component A has three or more functional groups, the total amount of the hydroxy groups over three of the component A containing hydroxyl groups so that the component A has three or more functional groups, is $\{A(OH)-2m\}$ (wherein m is the total number of moles of the total component A). In order to define D(OH), $\{C(NCO)-2A(OH)+2m\}\times 0.5$, which is a half of the site calculated by subtracting $\{A(OH)-2m\}$ from C(NCO)–A(OH), is used as the reference, as the upper limit is defined 1.4 times the $\{C(NCO)-2A(OH)+2m\}\times 0.5$, and as the lower limit is defined 0.7 times the $\{C(NCO)-2A(OH)+2m\}\times 0.5$. When the D(OH) is smaller than $\{C(NCO)-2A(OH)+2m\}\times 0.35$, the amount of unreacted oligomer tends to increase, which may result in the deterioration of the shock absorption properties, and bleeding of the unreacted oligomer from the cured product. On the other hand, if the D(OH) is greater than the $\{C(NCO)-2A(OH)+2m\}\times 0.70$, the cured product tends to become hard, which may result in the deterioration of the shock absorption properties. As defined by the formula (3), the D (OH) is from 0.35 to 0.70 times, preferably from 0.4 to 0.6 times the $\{C(NCO)-2A(OH)+2m\}$.

The urethane (meth) acrylate oligomer of the present invention is substantially free of unreacted isocyanate group, wherein "substantially free of" means that the urethane (meth)acrylate is completely free of unreacted isocyanate group (more specifically, no unreacted isocyanate group is detected), or contains a trace amount of unreacted isocyanate group, but its amount is so small that it will not adversely affect the effects of the present invention, specifically, optical qualities such as transparency and smoothness. The concentration of the unreacted isocyanate group in the oligomer is preferably 0.3% by mass or less, and most preferably 0. If the oligomer substantially contains unreacted isocyanate group, it reacts with moisture or the like to produce carbon dioxide thereby causing swelling, which results in the deterioration of optical qualities such as transparency, smoothness, and inclusion of bubbles, and the lifting of the adhesive interface. As described above, urethane reaction can be completely or at least almost completely progressed by a well known technique. Therefore, when the charges of the respective components are stoichiometric amounts defined by the formula (1), and these components are completely or at least almost completely reacted, the resultant oligomer can be substantially free of unreacted isocyanate group. Determination whether the final composition, the products of the reaction steps, and the resultant oligomer are substantially free of isocyanate group or not can be examined, for example, as described in the following example, on the basis of the presence or absence of absorption ($2250\ cm^{-1}$) of isocyanate group in an infrared absorption spectrum.

The weight average molecular weight of the urethane (meth) acrylate oligomer is not particularly limited, but is usually within the range of about 1000 to 60000. The weight average molecular weight may be determined in terms of standard polystyrene measured by gel permeation chromatography.

In the present invention, the components (A), (B), (C), and (D) may be allowed to react simultaneously (one-shot process), or sequentially. In order to obtain definitely formation of the desired urethane (meth) acrylate oligomer as the main product, the reaction is preferably carried out sequentially wherein at least one of these components is allowed to react sequentially. The sequential reaction may be carried out in various methods. For example, (i) Firstly, the components (A) and (C) are allowed to react together to produce a prepolymer having at one end thereof an isocyanate group, and then the prepolymer is allowed to react with the components (B) and (D) simultaneously or sequentially. In this case, the components (B) and/or (D) may be urethane monools obtainable through reaction with the components (C) and (A).

Alternatively, (ii) firstly, the components (B) and (C), the components (D) and (C) are allowed to react together to produce a monool urethane isocyanate compound and a (meth)acrylate group-containing isocyanate compound, respectively. Subsequently, these compounds are allowed to react with the component (A). In this case, the component (A) may be urethane polyol composed of the components (A) and (C).

Alternatively, (iii) firstly, the components (A) and (C) are allowed to react together to produce a prepolymer having both ends thereof isocyanate groups, and then the prepolymer is allowed to react with the component (B) to produce a prepolymer 1 having at one end thereof an isocyanate group. Separately, the components (A) and (C) are allowed to react together to produce a prepolymer having both ends thereof isocyanate groups, and the prepolymer is allowed to react with the component (D) to produce a prepolymer 2 having one end thereof an isocyanate group. The prepolymer 1 is further allowed to react with the component (A), and the reaction product is allowed to react with the prepolymer 2. When the component (A) is diol alone, the urethane (meth) acrylate oligomer produced by the method is D-C-A-C-A-C-A-C-B (see the below-described Example 1 and others). Also in this case, the component (A) may be an urethane polyol composed of the components (A) and (C). The process of the sequential reaction is not limited to these examples.

Alternatively, when the four components with different reaction rate with isocyanate groups, are used, even if all or three of them are allowed to react simultaneously, the desired urethane (meth)acrylate oligomer is securely produced as the main product in the same manner as the above-described sequential reaction. More specifically, (iv) the components (A), (B), and (D) whose reaction rates with isocyanate groups are (A)>(B)>(D), or (A)>(D)>(B) are mixed and allowed to react together simultaneously. Alternatively, (v) using the components (A) and (B) with the reaction rates with isocyanate groups are (A)>(B), the components (A), (B) and (C) are mixed and allowed to react together simultaneously, and then the reaction product is mixed and allowed to react with the component (D).

The reaction rate of each component with isocyanate group can be measured by tracking the absorption of isocyanate group (2250 cm$^{-1}$) with time during the reaction by, for example, infrared absorption spectrometry, wherein the ratio between the isocyanate group and hydroxy group (active hydrogen group) of the respective components are the same, and the reaction is carried out under stirring and under the same conditions (for example, reaction temperature and catalyst). Examples of the components (A), (B), and (D) whose reaction rates with isocyanate group satisfy (A)>(B)>(D) can include the followings: examples of the component (A) include polyols having at one end thereof a primary hydroxy group derived from ethylene oxide, examples of the component (B) include polyols having at one end thereof a secondary hydroxy group derived from propylene oxide and the like, and examples of the component (D) include acrylates containing a secondary hydroxyl group derived from propylene oxide and the like, and having reactivity of which has been decreased by steric hindrance of t-butyl group and the like. Examples of the components (A), (B), and (D) whose reaction rates with isocyanate group satisfy (A)>(D)>(B) can include the followings: examples of the component (A) include polyols having at one end thereof a primary hydroxy group derived from ethylene oxide, examples of the component (B) include silane compounds containing mercapto group, and examples of the component (D) include acrylate compounds containing a secondary hydroxyl group derived from propylene oxide.

Various types of urethanation reaction (more specifically, binding reaction between isocyanate group of the component (C) and hydroxy group of other component) are progressed under heating from normal temperature to 110° C. In order to adjust the reaction rate, a known catalyst may be used. Typical examples of the catalyst include organic metal compounds containing a metal such as tin, lead, and titanium, and tertiary amines such as triethylamine and triethylenediamine. Among them, organic tin compounds are preferred, and typical examples thereof include dibutyltin dilaurate, dioctyltin dilaurate, dibutyltin dioctoate, dibutyltin diacetate, dibutyltin maleate, dibutyltin mercapto propionate, dibutyltin bisisooctyl thioglycolate, dibutyltin dodecylmercaptide, tin 2-ethylhexanoate, stannous octoate, and stannous oleate. The preferred amount of the catalyst may be appropriately used to control the reaction rate between the isocyanate group and hydroxy group. In common cases, the amount of the catalyst is preferably from 0.001 to 10% by weight with reference to the all the materials.

In the urethanation reaction (acrylation reaction) of the hydroxy group-containing (meth)acrylate (D), in order to prevent gelation caused by radical polymerization during the reaction, it is preferable that the reaction mixture contains a polymerization inhibitor such as hydroquinone, hydroquinone monomethyl ether, p-methoxyphenol, p-benzoquinone at a concentration of usually from 50 to 2000 ppm. The acrylation reaction temperature is usually from normal temperature to 100° C., preferably from 50 to 85° C.

The above-described reaction product contains urethane (meth)acrylate oligomers as the main component. The reaction product composes an urethane (meth)acrylate oligomer composition containing a plurality of urethane (meth)acrylate oligomers. The urethane (meth)acrylate oligomer composition may contain by-product. In the present invention, the urethane (meth)acrylate oligomer composition may be used for, for example, preparation of the below-described photocurable resin composition.

The urethane (meth)acrylate oligomer composition preferably does not contain the component (C) in a free state. Accordingly, the above-described reaction is preferably continued until the component (C) in free state does not exist in the reaction mixture. Determination whether the component (C) in free state exists in the reaction mixture or not can be confirmed on the basis of the presence or absence of absorption of isocyanate group by taking out a portion of the reaction mixture to determine the infrared absorption spectrum. The period of the urethanation reaction is appropriately selected according to the reaction temperature and other conditions, and the reaction is usually completed in about 1 to 3 hours.

The urethane (meth)acrylate oligomer of the present invention has been described above. The present invention also provides the above-described method for producing the urethane (meth)acrylate oligomer of the present invention.

The photocurable composition of the present invention contains the urethane (meth)acrylate oligomer of the present invention and a photopolymerization initiator. The photopolymerization initiator may be a well-known photopolymerization initiator used for photopolymerization of vinyl monomers, and examples thereof include α-hydroxyisobutylphenonebenzoin, isopropylbenzoin ether, isobutylbenzoin ether, benzophenone, Michler's ketone, chlorothioxanthone, dodecylthioxanthone, dimethylthioxanthone, diethylthioxanthone, acetophenone diethyl ketal, benzyl dimethyl ketal, 1-hydroxycyclohexylphenyl ketone, 2-hydroxy-2-methyl-1-phenylpropane-1-one, 1-[4-(2-hydroxyethoxy)-phenyl]2-hydroxy-2-methyl-1-propane-1-one, 2-methyl-1-[4-(methylthio)phenyl]2-morpholinopropane-1-one, 2-benzyl-2-dimethylamino-1-(4-morpholinophenyl)-butanone-1, bis(2,4,6-trimethylbenzoyl)-phenylphosphine oxide, bis(2,4,6-trimethylbenzoyl)-diphenylphosphine oxide, a mixture of oxy-phenyl-acetic acid 2-[2-oxo-2-phenyl-acetoxy-ethoxy] ethyl ester and oxy-phenyl-acetic acid 2-[2-hydroxy-ethoxy]-ethyl ester. Usually, the initiator is selected in consideration of the absorption properties of the photoirradiation device, and is preferably benzyl dimethyl ketal, 1-hydroxycyclohexylphenyl ketone, or 2-hydroxy-2-methyl-1-phenylpropane-1-one. If internal curability is insufficient, unreacted components may migrate to the surface of the adhesive material and cause stickiness over time. In general cases, the additive amount of the initiator is added usually from 0.1 to 20% by weight, preferably from 0.3 to 5% by weight with reference to the whole photocurable component content in the photocurable composition. The urethane (meth) acrylate oligomer itself may be thermally cured, but is particularly preferably photocured thereby efficiently producing a sheet containing no bubble, having a thickness enough to achieve cushioning effect, for example, 0.2 mm or more.

The photocurable composition of the present invention contains a hydroxy group-containing (meth)acrylate compound thereby acquiring fog resistance in an environment having, for example, a temperature of 50° C. and a relative humidity of 95%. The additive amount of the hydroxy group-containing (meth)acrylate compound is from 1 to 30% by weight, preferably from 3 to 20% by weight with reference to the whole photocurable component. If the additive amount is less than 1% by weight, the urethane (meth)acrylate oligomer composed of polyoxyalkylene polyol and polyoxyalkylene monool free of ethylene oxide component may have insufficient fog resistance under high temperature and high humidity conditions. If the additive amount is more than 30% by weight, physical properties of the cured product such as softness and toughness may deteriorate. Examples of the hydroxy group-containing (meth)acrylate compound used in the present invention include alkylene oxide adducts of (meth) acrylic acid, dehydration condensates of polyhydric alcohols with (meth)acrylic acids, and derivatives produced therefrom as a starting material, and (meth) acrylic acid adducts of epoxy group-containing compounds. Preferable examples are condensates of polyhydric alcohols with (meth)acrylic acids. Specific examples can include hydroxyl group-containing polyol (meth)acrylates, for example, hydroxyalkyl (meth)acrylates such as: mono(meth)acrylates of alkanediols, particularly alkanediols having 1 to 8 carbon atoms, such as hydroxyethyl (meth)acrylate, hydroxypropyl (meth)acrylate, hydroxybutyl (meth)acrylate, hydroxypentyl (meth)acrylate, hydroxyhexyl (meth)acrylate, hydroxyheptyl (meth)acrylate, and hydroxyoctyl (meth)acrylate; mono (meth)acrylates and di(meth)acrylates of alkane polyols, particularly alkane polyols having 1 to 8 carbon atoms, such as alkanetriol mono(meth)acrylate, alkanetriol di(meth)acrylate, alkanetetraol mono(meth)acrylate, alkanetetraol di(meth)acrylate, alkanepentaol mono(meth)acrylate, alkanepentaol di(meth)acrylate, alkanehexaol mono(meth) acrylate, and alkanehexaol di(meth)acrylate; and polyalkylene glycol mono (meth)acrylates, for example, polyether poly(meth)acrylates such as diethylene glycol mono(meth) acrylate, dipropylene glycol mono(meth)acrylate, triethylene glycol mono(meth)acrylate, and tetraethylene glycol mono (meth)acrylate.

The photocurable composition of the present invention may contain an acryl syrup thereby further improving its stickiness. The acryl syrup referred herein is a partial polymer of acrylate monomer. More specifically, the acryl syrup is obtainable by dissolving a high molecular weight polymer in a low molecular weight polymer and/or a monomer, or by stopping the polymerization reaction of the monomer at the intermediate stage. The ester portion of the acrylate is not particularly limited, but preferably an alkyl group having 1 to 8 carbon atoms, or a hydroxyalkyl group having 1 to 8 carbon atoms. The weight ratio between the high molecular weight polymer and low molecular weight polymer and/or monomer in the acryl syrup is not particularly specified, but usually, the ratio of the low molecular weight polymer and/or monomer is about 50 to 200 with reference to 100 of the high molecular weight polymer. The weight average molecular weight of the high molecular weight polymer is within the range of about 50000 to 200000, and the weight average molecular weight of the low molecular weight polymer is usually less than 50000, preferably less than 10000. The weight average molecular weight may be determined in terms of standard polystyrene measured by gel permeation chromatography.

Various additives known in the technical field of polyurethane may be used for the urethane (meth)acrylate oligomer or photocurable composition of the present invention. Examples of the additive include the above-described urethanation reaction catalysts, in addition, age inhibitors, antifoaming agents, and flame retardants. These additives are added in amounts which will not adversely affect the effect of the present invention, and the concentration thereof is usually 10% by weight or less, preferably 5% by weight or less with reference to the whole composition.

Examples of the above age inhibitor include hindered phenols, benzotriazoles, and hindered amines such as butylated hydroxytoluene (BHT) and butylated hydroxyanisole (BHA).

Examples of the above flame retardant include chloroalkyl phosphate, dimethyl-methyl phosphate, ammonium polyphosphate, neopentyl bromide-polyether, brominated polyether, and bromine and phosphorus compounds. Examples of the above anti-foaming agent include DISPARLON OX-710 (trade name, manufactured by Kusumoto Chemicals, Ltd.).

As necessary, a reactive diluent may be used for the urethane (meth)acrylate oligomer or photocurable composition of the present invention, thereby controlling its viscosity. As the diluent, a low molecular weight mono(meth)acrylate or di(meth)acrylate compound usually having a viscosity of 1000 mPa·s/25° C. or less, may be used. In particular, the addition of a hydroxy group-containing acryl monomer as the viscosity controlling reactive diluent imparts fog resistance under conditions, for example, having a temperature of 50° C. and a relative humidity of 95%. The hydroxy group-containing acryl monomer used as the reactive diluent is preferably a hydroxyalkyl ester of acrylic acid, and its molecular weight is preferably within the range of about 100 to 2000. The additive amount of the hydroxy group-containing acryl monomer is from 1 to 30% by weight, preferably from 3 to 20% by weight with reference to the photocurable component. If the additive amount is less than 1% by weight, fog resistance may be insufficient under high temperature and high humidity conditions. If more than 30% by weight, physical properties of the cured product, such as flexibility and toughness may deteriorate.

The sheet of the present invention can be produced by applying the photocurable composition of the present invention on a substrate in a sheet form thereby forming a photocurable composition layer, and curing the layer with photoirradiation. The light source lamp used for the photoirradiation is preferably one having luminescence distribution below the wavelength of 400 nm or less. Examples of such lamp include low pressure mercury lamps, medium pressure mercury lamps, high pressure mercury lamps, ultrahigh pressure mercury lamps, chemical lamps, black light lamps, metal halide lamps, and microwave excited mercury lamps. The radiation energy is not particularly limited, and is usually about 1000 to 4000 mJ/cm$^2$.

The sheet of the present invention combines both adequate adhesion and reworkability, and can be formed to an desired thickness so as to provide excellent shock absorption properties without inclusion of bubbles or the like. The thickness of the sheet of the present invention is not particularly limited, and is preferably about 0.2 mm to 2 mm. The sheet of the present invention exhibits remarkably excellent effect when it is used as a transparent adhesive sheet for affixing an optical member to a display.

The present invention provides a sheet which has excellent shock absorption properties, combines both adequate adhesion and reworkability, provides excellent transparency with no inclusion of bubbles, marked mass productivity, and non-polluting properties. The present invention also provides an urethane (meth)acrylate oligomer providing the sheet, a method for producing the same, and a photocurable composition. The sheet of the present invention imparts impact resistance to a transparent member of a display or the like, and, even if a failure occurs in the production process, the sheet can be removed without damaging the adherend owing to its excellent removability. Accordingly, the sheet improves the yield thereby contributing to the slimming down of display panels. In addition, the sheet contains no secondary ingredient such as a plasticizer, so that provides excellent reliability during long-term use without polluting the adherend.

The present invention is further described below with reference to examples and comparative examples, but the present invention is not limited to the following examples.

EXAMPLES

The polyoxyalkylene polyol, monool, and acryl syrup used in the following examples and comparative examples are described below.

The polyoxyalkylene polyol (a1) is a polyoxypropylene diol having a hydroxyl value of 55.0 mgKOH/g, which is obtained by adding propylene oxide (PO) to a PO adduct (hydroxyl value: 112 mgKOH/g) of propylene glycol (PG) by using potassium hydroxide.

The polyoxyalkylene polyol (a2) is a polyoxypropylene-ethylenediol containing oxyethylene groups at a ratio of 12% by mass and having a hydroxyl value of 28.0 mgKOH/g, which is obtained by adding ethylene oxide (EO) to a propylene oxide (PO) adduct (hydroxyl value: 36 mgKOH/g) of propylene glycol (PG) by using potassium hydroxide.

The polyoxyalkylene polyol (a3) is a polyoxypropylene-ethylenetriol containing oxyethylene groups at a ratio of 12% by mass and having a hydroxyl value of 16.8 mgKOH/g, which is obtained by adding propylene oxide (PO) to a PO adduct (hydroxyl value: 168 mgKOH/g) of glycerol, which is used as the initiator, by using potassium hydroxide, and then adding ethylene oxide (EO) to the adduct under catalysis of potassium hydroxide.

The monool (b1) is a polyoxypropylene monool having a hydroxyl value of 16.7 mgKOH/g, which is obtained by adding propylene oxide (PO) to n-butanol by using potassium hydroxide.

The acryl syrup (h1) was prepared as follows. Into a 2-liter round bottom flask equipped with a condenser, a nitrogen inlet tube, a thermometer, and a stirrer, charged were 850 g of 2-ethylhexyl acrylate (2-EHA), which is an alkyl acrylate, 150 g of 2-hydroxyethyl acrylate (2-HEA), and 1.5 g of n-dodecyl mercaptan (NDM) as chain transferring agent. The mixture was heated to 60° C. in a nitrogen flow, and then heating was stopped. Subsequently, 0.025 g of 2,2'-azobis(4-methoxy-2,4-dimethylvaleronitrile) (V-70, manufactured by Wako Pure Chemical Industries, Ltd.) as polymerization initiator was added and uniformly mixed under stirring, and the mixture was allowed to react under stirring without cooling thereby increasing the temperature of the reaction system to 125° C. Stirring was further continued. When the temperature did not increase any more and the temperature of the reaction system reached 120° C., 212.5 g of 2-EHA, 37.5 g of 2-HEA, and 0.75 g of NDM were added to the reaction system, and the system was rapidly cooled to 60° C. by external cooling. The reaction system was purged at the temperature for 30 minutes with nitrogen under stirring. Subsequently, 0.05 g of V-70 as polymerization initiator was added under stirring, the temperature of the reaction system was increased to 120° C., and then 212.5 g of 2-EHA and 37.5 g of 2-HEA were added to the system, and the system was rapidly cooled to make acryl syrup. The resultant acryl syrup, which is a partial polymer of acrylic monomer, was composed of 50% by weight of an initial acrylic polymer and 50% by weight of a monomer, wherein the weight average molecular weight (Mw) of the polymer was 100000.

Preparation of Urethane (Meth)Acrylate Oligomer

An example of the method for preparing the urethane (meth)acrylate oligomer of the present invention by a prepolymer process is described below. The oligomer may be prepared by a one-shot process as long as no gelation occurs during reaction.

Preparation of Prepolymer for Producing Urethane (Meth) Acrylate Oligomer

Prepolymer H1: Into a four-necked flask equipped with a stirrer, a dropping funnel, a nitrogen inlet tube, and a thermometer, charged were 1000 g of polyoxyalkylene polyol (a1), 165 g of hexamethylene diisocyanate (HDI), and 0.1 g of dibutyltin dilaurate. The mixture was allowed to react at 100° C. for 4 hours. Subsequently, 1,660 g of monool (b1) was added into the flask, and allowed to react at temperature 100° C. for 2 hours thereby obtaining a prepolymer H1 containing isocyanate group at a ratio of 0.70% by mass. The structure of the prepolymer H1 was HDI-a1-HDI-b1 (wherein HDI, a1, and b1 are the residues of the above-described compounds HDI, a1, and b1, respectively; also in the following structural formulae, the symbol of a compound represents the residue of the compound).

Prepolymer H2:

0.2 g of hydroquinone monomethyl ether as polymerization inhibitor was added to the ingredients of the prepolymer H1, except that 1,660 g of the monool (b1) was replaced with 57 g of 2-hydroxyethyl acrylate (2-HEA). The mixture was allowed to react at 85° C. for 2 hours thereby obtaining a prepolymer H2 containing isocyanate group at a ratio of 1.70% by mass. The structure of the prepolymer H2 was HDI-a1-HDI-HEA (wherein HEA represents the residue of 2-HEA, hereinafter the same applies).

Prepolymer X1:

Into a four-necked flask equipped with a stirrer, a dropping funnel, a nitrogen inlet tube, and a thermometer, charged were 1,000 g of polyoxyalkylene polyol (a2), 94 g of xylylene diisocyanate (XDI), and 0.1 g of dibutyltin dilaurate. The mixture was allowed to react at 100° C. for 4 hours. Subsequently, 840 g of the monool (b1) was added into the flask, and allowed to react at temperature 100° C. for 2 hours thereby obtaining a prepolymer X1 containing isocyanate group at a ratio of 0.55% by mass. The structure of the prepolymer X1 was XDI-a2-XDI-b1.

Prepolymer X2:

0.2 g of hydroquinone monomethyl ether as polymerization inhibitor was added to the ingredients of the prepolymer X1, except that 840 g of the monool (b1) was replaced with 29 g of 2-hydroxyethyl acrylate (2-HEA). The mixture was allowed to react at 85° C. for 2 hours thereby obtaining a prepolymer X2 containing isocyanate group at a ratio of 0.93% by mass. The structure of the prepolymer X2 was XDI-a2-XDI-HEA.

Prepolymer X3:

Into a four-necked flask equipped with a stirrer, a dropping funnel, a nitrogen inlet tube, and a thermometer, charged were 1,000 g of polyoxyalkylene polyol (a2), 94 g of xylylene diisocyanate (XDI), and 0.1 g of dibutyltin dilaurate. The mixture was allowed to react at 100° C. for 4 hours. Subsequently, 45 g of 3-mercaptopropylmethyldimethoxysilane (b2) was added into the flask, and allowed to react at temperature 100° C. for 2 hours thereby obtaining a prepolymer X3 containing isocyanate group at a ratio of 0.94% by mass. The structure of the prepolymer X3 was XDI-a2-XDI-b2.

Preparation of urethane (meth)acrylate oligomer

Example 1

Preparation of Oligomer 1

Into a four-necked flask equipped with a stirrer, a dropping funnel, a nitrogen inlet tube, and a thermometer, charged were 1,000 g of polyoxyalkylene polyol (a1) and 2,810 g of the prepolymer H1. The mixture was allowed to react at 100° C. for 2 hours. Subsequently, 1,210 g of the prepolymer H2 was added into the flask, and allowed to react at temperature 85° C. for 2 hours. Disappearance of the absorption of isocyanate group (2250 cm$^{-1}$) was confirmed by infrared absorption spectrometry, and then the reaction was stopped. The main structure of the oligomer 1 was HEA-HDI-a1-HDI-a1-HDI-a1-HDI-b1.

Example 2

Preparation of Oligomer 2

In the same manner as in Example 1, 1,000 g of polyoxyalkylene polyol (a2) and 1,880 g of the prepolymer X1 were mixed and allowed at 100° C. for 2 hours. Subsequently, 1,120 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 2 was HEA-XDI-a2-XDI-a2-XDI-a2-XDI-b1.

Example 3

Preparation of Oligomer 3

In the same manner as in Example 1, 1,000 g of polyoxyalkylene polyol (a3) and 1,140 g of the prepolymer H1 were mixed and allowed at 100° C. for 2 hours. Subsequently, 250 g of the prepolymer H2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 3 is shown below.

[Chemical formula 1]

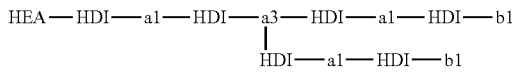

Example 4

Preparation of Oligomer 4

In the same manner as in Example 1, 1,000 g of polyoxyalkylene polyol (a3) and 1,530 g of the prepolymer X1 were mixed and allowed at 100° C. for 2 hours. Subsequently, 440 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 4 is shown below.

[Chemical formula 2]

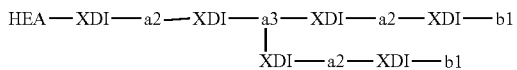

Example 5

Preparation of Oligomer 5

In the same manner as in Example 1, 1,000 g of polyoxyalkylene polyol (a3) and 1,360 g of the prepolymer X1 were mixed and allowed at 100° C. for 2 hours. Subsequently, 540 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 5 was the same as that of the oligomer 4.

Example 6

Preparation of Oligomer 6

In the same manner as in Example 1, 1,000 g of polyoxyalkylene polyol (a3) and 1,670 g of the prepolymer X1 were mixed and allowed at 100° C. for 2 hours. Subsequently, 360 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 6 was the same as that of the oligomer 4.

Example 7

Preparation of Mixture of Oligomer 2 and Acryl Syrup

Into a four-necked flask equipped with a stirrer, a dropping funnel, a nitrogen inlet tube, and a thermometer, charged were 700 g of the oligomer 2 and 300 g of the acryl syrup (h1). These ingredients were mixed at 60° C. for 15 minutes.

Example 8

Preparation of Mixture of Oligomer 2 and Hydroxy Group-Containing (Meth)Acrylate Compound Into a four-necked flask equipped with a stirrer, a dropping funnel, a nitrogen inlet tube, and a thermometer, charged were 900 g of the oligomer 2 and 100 g of 2-hydroxy methacrylate (2-HEMA). These ingredients were mixed at 60° C. for 15 minutes.

Comparative Example 1

Preparation of Oligomer 7

In the same manner as in Examples 1 to 6, 1,000 g of polyoxyalkylene polyol (a1) and 2,420 g of the prepolymer H2 were mixed. The mixture was allowed to react at 85° C. for 2 hours. Disappearance of the absorption of isocyanate group (2250 cm$^{-1}$) was confirmed by infrared absorption spectrometry, and then the reaction was stopped. The main structure of the oligomer 7 was HEA-HDI-a1-HDI-a1-HDI-a1-HDI-HEA. The essential component (B) was not used in Comparative Example 1.

Comparative Example 2

Preparation of Oligomer 8

In the same manner as in Comparative Example 1, 1,000 g of polyoxyalkylene polyol (a3) and 1,140 g of the prepolymer X1 were mixed. The mixture was allowed to react at 100° C. for 2 hours. Subsequently, 670 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 8 was the same as that of the oligomer 4. However, the average number of the (meth)acrylate derived from the component (D) (hereinafter may be simply called "the number of acryl group") within one molecule of the urethane (meth)acrylate oligomer formed after completion of the reaction of the whole amount of the component (D) was 1.5, which was beyond the range defined in the present invention.

Comparative Example 3

Preparation of Oligomer 9

In the same manner as in Comparative Example 1, 1,000 g of polyoxyalkylene polyol (a3) and 1,910 g of the prepolymer X1 were mixed. The mixture was allowed to react at 100° C. for 2 hours. Subsequently, 220 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 9 was the same as that of the oligomer 4. However, the number of acryl group was about 0.5, which was below the range defined in the present invention.

Example 9

Preparation of Mixture of Oligomer 1 and (Meth)Acrylate Compound Containing No Hydroxy Group Into a four-necked flask equipped with a stirrer, a dropping funnel, a nitrogen inlet tube, and a thermometer, charged were 900 g of the oligomer 1 and 100 g of 2-hydroxy acrylate (2-EHA). These ingredients were mixed at 60° C. for 15 minutes.

Example 10

Preparation of Oligomer 10

In the same manner as in Examples 1 to 6, 1,000 g of polyoxyalkylene polyol (a2) and 1,120 g of the prepolymer X3 were mixed. The mixture was allowed to react at 100° C. for 2 hours. Subsequently, 1,120 g of the prepolymer X2 was added into the flask, and allowed to react at 85° C. for 2 hours. Disappearance of the absorption of isocyanate group (2250 cm$^{-1}$) was confirmed by infrared absorption spectrometry, and then the reaction was stopped. The main structure of the oligomer 10 was HEA-XDI-a2-XDI-a2-XDI-a2-XDI-b2.

Example 11

Formation of Sheet

To each of the oligomer solutions of the examples and comparative examples, 2% by weight of 1-hydroxycyclohexyl phenylketon (IRGACURE 184, manufactured by Ciba Specialty Chemicals) as photopolymerization initiator was added thereby making photosensitive solutions. The photosensitive solutions were individually applied in a thickness 1 mm onto a polyethylene terephthalate (PET) film having a thickness of 100 μm. Each of the sheet was covered with a releasing PET film treated with a releasing agent, and irradiated with ultraviolet light at 2000 mJ/cm$^2$ using a high pressure mercury lamp thereby forming a self-adhesive sheet.

Evaluation of Shock Absorption Properties

The releasing PET film was removed from each of the UV-cured sheets, and the sheets were individually affixed to soda glass plates with 10 cm square and a thickness of 3 mm without inclusion of bubbles thereby making specimens. Sandpaper (#600) was placed on a stainless steel plate having a thickness of 10 cm with the abrasive surface upward, and the specimens were individually placed thereon with the PET film side upward. A steel ball weight having a weight of 130 g was allowed to fall freely from the height increased in increments of 1 cm, and the last height but one at which the glass plate broken was recorded as Hc. The shock resistance energy Ec was calculated by the following formula:

$Ec=0.13 \times Hc \times 9.8$

Evaluation of Stickiness

Strap-shaped cured sheets having a width of 25 mm and a length of 10 cm were formed, the releasing PET was removed from each of the sheets, and the sheets were individually affixed to large soda glass plates having a thickness of 3 mm not so as to include bubbles. A hole for passing a hook was made at the tip of the respective strap-shaped cured sheets, and the 90° peel force was measured at a tension rate of 300 mm/minute using a digital force gauge (DPRSX-50T, manufactured by IMADA CO. LTD.).

Evaluation of Anti-Bleeding Properties

The UV-cured sheets were allowed to stand for 10 days in an oven at 100° C., and the presence or absence of the occurrence of bleeding from the surface of the cured sheets was observed visually after a lapse of 10 days. Those caused bleeding were rated as A, and no bleeding as B.

Evaluation of Transparency

The UV-cured sheets having a thickness of 1 mm were measured for haze according to JIS K7105. Those with a haze of less than 1% were rated as A, and 1% or more as B.

Evaluation of Humidity and Heat Resistance

The UV-cured sheets having a thickness of 1 mm were allowed to stand for 7 days under conditions having a temperature of 50° C. and a relative humidity of 95%, and the haze in the cured sheets was measured. Those with a haze of less than 1% were rated as A, and 1% or more as B.

TABLE 1

|  |  | Example 1 | Example 2 | Example 3 | Example 4 |
|---|---|---|---|---|---|
| Ingredients (% by weight) | Polyoxyalkylene polyol (a1) | 19.9 | — | — | — |
|  | Polyoxyalkylene polyol (a2) | — | 25.0 | — | — |
|  | Polyoxyalkylene polyol (a3) | — | — | 41.9 | 33.7 |
|  | Monool prepolymer (H1) | 56.0 | — | 47.7 | — |
|  | Acrylic prepolymer (H2) | 24.1 | — | 10.5 | — |
|  | Monool prepolymer (X1) | — | 47.0 | — | 51.5 |
|  | Acrylic prepolymer (X2) | — | 28.0 | — | 14.8 |

TABLE 1-continued

|  |  | Example 1 | Example 2 | Example 3 | Example 4 |
|---|---|---|---|---|---|
|  | Silane-modified prepolymer (X3) | — | — | — | — |
|  | Acryl syrup (h1) |  |  |  |  |
| Calculated value (component ratio) | {A(OH) + B(active hydrogen) + D(OH)}/C(NCO) | 1.0 | 1.0 | 1.0 | 1.0 |
|  | C(NCO)/A(OH) | 1.33 | 1.33 | 1.33 | 1.33 |
|  | D(OH) | 0.049 | 0.025 | 0.010 | 0.010 |
| Calculated value (reference) | D(OH) upper limit*[1] | 0.067 | 0.034 | 0.014 | 0.013 |
|  | D(OH) upper limit*[2] | 0.034 | 0.017 | 0.007 | 0.007 |
| Physical properties | Shock-absorbing properties Ec[J] | 0.23 | 0.25 | 0.38 | 0.42 |
|  | Stickiness [N/25 mm] | 1.5 | 3.0 | 2.5 | 4.2 |
|  | Anti-bleeding properties | A | A | A | A |
|  | Transparency | A | A | A | A |
|  | Moisture and heat resistance | B | A | A | A |

*[1]Upper limit of D(OH) satisfying D(OH) ≤ {C(NCO) − 2A(OH) + 2m} × 0.70 (the same applies in Tables 2 to 4)
*[2]Lower limit of D(OH) satisfying {C(NCO) − 2A(OH) + 2m} × 0.35 ≤ D(OH) (the same applies in Tables 2 to 4)

TABLE 2

|  |  | Example 5 | Example 6 | Example 7 | Example 8 |
|---|---|---|---|---|---|
| Ingredients (% by weight) | Polyoxyalkylene polyol (a1) | — | — | — | — |
|  | Polyoxyalkylene polyol (a2) | — | — | — | — |
|  | Polyoxyalkylene polyol (a3) | — | — | 17.5 | 22.5 |
|  | Monool prepolymer (H1) | 34.5 | 33.0 | — | — |
|  | Acrylic prepolymer (H2) | — | — | — | — |
|  | Monool prepolymer (X1) | — | — | — | — |
|  | Acrylic prepolymer (X2) | 46.9 | 55.1 | 32.9 | 42.3 |
|  | Silane-modified prepolymer (X3) | 18.6 | 11.9 | 19.6 | 25.2 |
|  | Acryl syrup (h1) | — | — | 30 | — |
|  | 2-HEMA | — | — | — | 10 |
| Calculated value (component ratio) | {A(OH) + B(active hydrogen) + D(OH)}/C(NCO) | 1.0 | 1.0 | 1.0 | 1.0 |
|  | C(NCO)/A(OH) | 1.33 | 1.33 | 1.33 | 1.33 |
|  | D(OH) | 0.012 | 0.008 | 0.025 | 0.025 |
| Calculated value (reference) | D(OH) upper limit*[1] | 0.014 | 0.014 | 0.034 | 0.034 |
|  | D(OH) upper limit*[2] | 0.007 | 007 | 0.017 | 0.017 |
| Physical properties | Shock-absorbing properties Ec[J] | 0.36 | 0.48 | 0.41 | 0.38 |
|  | Stickiness [N/25 mm] | 2.8 | 4.2 | 6.0 | 1.3 |
|  | Anti-bleeding properties | A | A | A | A |
|  | Transparency | A | A | A | A |
|  | Moisture and heat resistance | A | A | A | A |

TABLE 3

|  |  | Comparative Example 1 | Comparative Example 2 | Comparative Example 3 | Example 9 |
|---|---|---|---|---|---|
| Ingredients (% by weight) | Polyoxyalkylene polyol (a1) | 30.3 | — | — | 17.9 |
|  | Polyoxyalkylene polyol (a2) | — | — | — | — |
|  | Polyoxyalkylene polyol (a3) | — | 34.7 | 31 | — |
|  | Monool prepolymer (H1) | — | — | — | 50.4 |
|  | Acrylic prepolymer (H2) | 69.7 | — | — | 21.7 |
|  | Monool prepolymer (X1) | — | 41.7 | 61.9 | — |
|  | Acrylic prepolymer (X2) | — | 23.6 | 7.1 | — |
|  | Silane-modified prepolymer (X3) | — | — | — | — |
|  | Acryl syrup (h1) | — | — | — | — |
|  | 2-EHA | — | — | — | 10 |
| Calculated value (component ratio) | {A(OH) + B(active hydrogen) + D(OH)}/C(NCO) | 1.0 | 1.0 | 1.0 | 1.0 |
|  | C(NCO)/A(OH) | 1.33 | 1.33 | 1.33 | 1.33 |
|  | D(OH) | 0.097 | 0.15 | 0.005 | 0.049 |
| Calculated value (reference) | D(OH) upper limit*[1] | 0.067 | 0.014 | 0.014 | 0.067 |
|  | D(OH) upper limit*[2] | 0.034 | 0.007 | 0.007 | 0.034 |
| Physical properties | Shock-absorbing properties Ec[J] | 0.06 | 0.18 | 0.38 | 0.32 |
|  | Stickiness [N/25 mm] | 0.01 | 2.3 | 5.0 | 1.2 |
|  | Anti-bleeding properties | A | A | B | A |
|  | Transparency | A | A | A | A |
|  | Moisture and heat resistance | B | A | A | B |

TABLE 4

|  |  | Example 10 |
|---|---|---|
| Ingredients (% by weight) | Polyoxyalkylene polyol (a1) | — |
|  | Polyoxyalkylene polyol (a2) | 30.8 |
|  | Polyoxyalkylene polyol (a3) | — |
|  | Monool prepolymer (H1) | — |
|  | Acrylic prepolymer (H2) | — |
|  | Monool prepolymer (X1) | — |
|  | Acrylic prepolymer (X2) | 34.6 |
|  | Silane-modified prepolymer (X3) | 34.6 |
|  | Acryl syrup (h1) | — |
|  | 2-EHA | — |
| Calculated value (component ratio) | {A(OH) + B(active hydrogen) + D(OH)}/C(NCO) | 1.0 |
|  | C(NCO)/A(OH) | 1.33 |
|  | D(OH) | 0.025 |
| Calculated value (reference) | D(OH) upper limit*[1] | 0.034 |
|  | D(OH) upper limit*[2] | 0.017 |
| Physical properties | Shock-absorbing properties Ec[J] | 0.45 |
|  | Stickiness [N/25 mm] | 3.5 |
|  | Anti-bleeding properties | A |
|  | Transparency | A |
|  | Moisture and heat resistance | A |

The sheets of Examples 1 to 9 exhibited good shock absorption properties and stickiness, the measurements were 0.2 J or more and 1 N/25 mm or more, respectively. In addition, the anti-bleeding properties and transparency were also good, and the sheets were readily produced by a method of applying the respective compositions. Example 1 contained no ethylene oxide component in the polyoxyalkylene polyol and monool, so that haze occurred after standing in a high temperature and high humidity environment. But Example 8 composed of the same oligomer and 2-HEMA showed a good result. Example 9 contained no ethylene oxide component in the polyoxyalkylene polyol and monool, and contained 2-EHA, which is a monomer containing no hydroxy group, as diluent, so that haze occurred after standing in a high temperature and high humidity environment, but other properties were excellent. Therefore, the sheet of Example 9 is applicable to uses which will not subjected to severe high temperature and high humidity conditions.

Comparative Example 1 did not contain the component (B), and the D(OH) exceeded the upper limit defined by the formula (3). Therefore, its shock absorption properties and stickiness were insufficient. Further, since it contained no ethylene oxide component in the polyoxyalkylene polyol, a haze developed under the high temperature and high humidity conditions. In Comparative Example 2, the D(OH) exceeded the upper limit defined by the formula (3), so that the shock absorption properties were insufficient. In Comparative Example 3, the D(OH) was below the lower limit defined by the formula (3), so that the anti-bleeding properties were not good.

The invention claimed is:

1. A method of producing a display panel with an optical member, the optical member being affixed to the display panel, comprising the steps of:
preparing a transparent adhesive sheet comprising a photocurable composition layer;
affixing the optical member to the display panel using the photocurable composition layer of the transparent adhesive sheet,
wherein the photocurable composition layer is formed from a photocurable composition comprising: a urethane (meth)acrylate oligomer,
the urethane (meth)acrylate oligomer being substantially free of unreacted isocyanate group, the urethane (meth)acrylate oligomer having been obtained by reacting at least one polyoxyalkylene polyol (A), at least one monool (B1) which is soluble in the component (A) and/or at least one silane coupling agent (B2) which can react with isocyanate group, at least one polyisocyanate (C), and at least one hydroxy group-containing mono (meth)acrylate compound (D) at a ratio so that the equivalent weights of the hydroxy group, active hydrogen group, and isocyanate group of the respective components satisfy the following formulae (1) to (3):

$$B(\text{active hydrogen}) + D(\text{OH}) = C(\text{NCO}) - A(\text{OH}) \quad (1)$$

$$1.05 \leq C(\text{NCO})/A(\text{OH}) \leq 2 \quad (2)$$

$$\{C(\text{NCO}) - 2A(\text{OH}) + 2m\} \times 0.35 \leq D(\text{OH}) \leq \{C(\text{NCO}) - 2A(\text{OH}) + 2m\} \times 0.70 \quad (3)$$

wherein in the formulae (1) to (3), A(OH) represents the total equivalent weight of the hydroxy group of the component (A), B(active hydrogen) represents the total equivalent weight of the active hydrogen group of the component (B1) and/or (B2), C(NCO) represents the total equivalent weight of the isocyanate group of the component (C), and D(OH) represents the total equivalent weight of the hydroxy group of the component (D), and m represents the number of moles of the component (A).

2. The method of producing a display panel with an optical member according to claim 1, wherein the component (A) is diol and/or triol.

3. The method of producing a display panel with an optical member according to claim 1, wherein at least one selected from the group consisting of the components (A), (B1), and (B2) comprises an ethylene oxide unit.

4. The method of producing a display panel with an optical member according to claim 1, wherein the component (A) is polyoxyalkylene polyol having a number average molecular weight within the range of 1000 to 20000 and being obtainable by condensation of an aliphatic, alicyclic, or aromatic compound containing two or more hydroxyl groups with oxyalkylene having 2 to 4 carbon atoms.

5. The method of producing a display panel with an optical member according to claim 1, wherein the component (B1) is polyoxyalkylene monool, acryl monool, castor oil-based monool, or natural or synthetic monool having 6 or more carbon atoms.

6. The method of producing a display panel with an optical member according to claim 1, wherein the component (C) is an aliphatic, alicyclic, or aromatic diisocyanate containing two isocyanate groups.

7. The method of producing a display panel with an optical member according to claim 1, wherein the component (D) is an ester of (meth)acrylic acid and an aliphatic, alicyclic, or aromatic diol.

8. The method of producing a display panel with an optical member according to claim 1, wherein the photocurable composition further comprises a photopolymerization initiator.

9. The method of producing a display panel with an optical member according to claim 8, wherein the photocurable composition further comprises a hydroxy group-containing (meth)acrylate compound.

10. The method of producing a display panel with an optical member according to claim 8, wherein the photcurable composition further comprises acryl syrup.

11. The method of producing a display panel with an optical member according to claim 8, further comprising curing the photocurable composition layer with photoirradiation.

12. The method of producing a display panel with an optical member according to claim 9, further comprising curing the photocurable composition layer with photoirradiation.

13. The method of producing a display panel with an optical member according to claim 10, further comprising curing the photocurable composition layer with photoirradiation.

* * * * *